Sept. 21, 1943.   F. H. NICKLE ET AL   2,330,139
EAR CORN CRUSHING MACHINE
Filed July 5, 1941
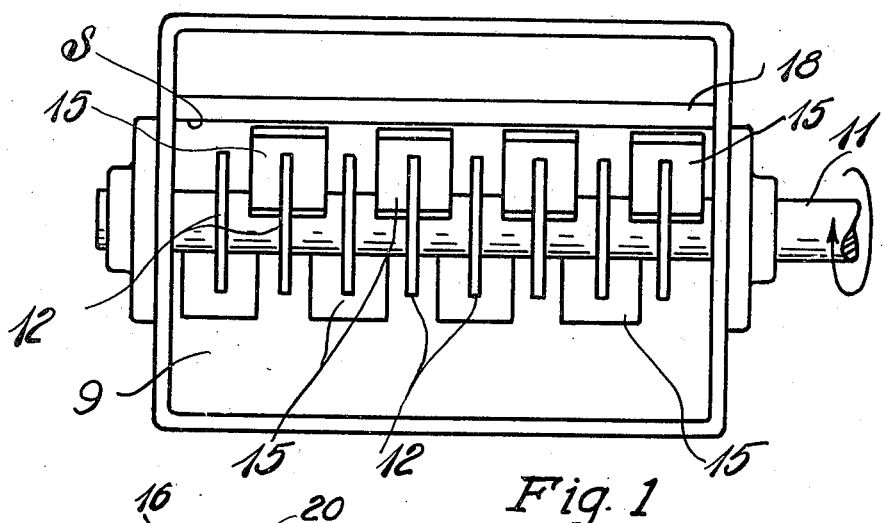
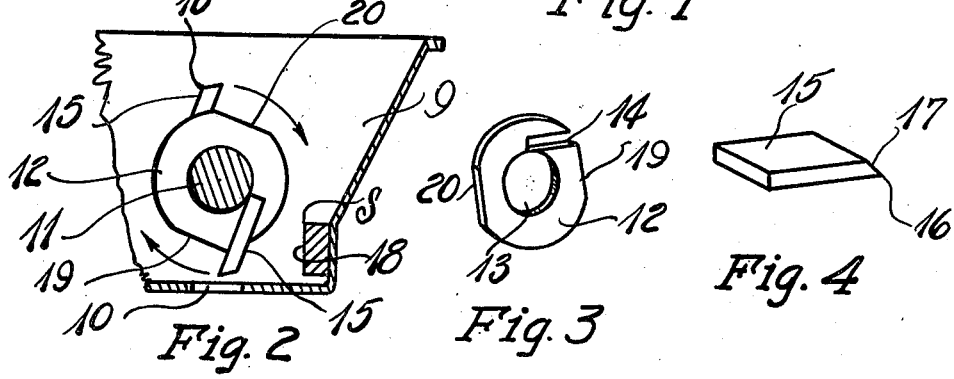
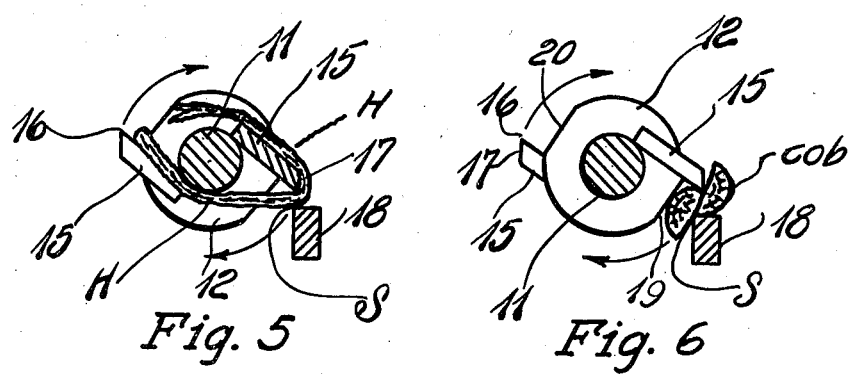
INVENTORS
Frank H. Nickle
BY Arthur G. Nickle
Frank C. Searman
ATTORNEY.

Patented Sept. 21, 1943

2,330,139

UNITED STATES PATENT OFFICE 2,330,139

EAR CORN CRUSHING MACHINE

Frank H. Nickle and Arthur G. Nickle,
Saginaw, Mich.

Application July 5, 1941, Serial No. 401,261

3 Claims. (Cl. 83—6)

This invention relates to machines having toothed rolls that are adapted for reducing materials by cutting, shredding and crushing action. More especially, it relates to machines that are adapted for pre-crushing and feeding ear corn to pulverizing mills, such ear corn not being completely husked. Such reducing machines, usually referred to as crusher-feeders, are ordinarily equipped with a flow-controlling mechanism that enables the operator to manually regulate the rate of efflux. However, the flow-controlling mechanism forms no part of this invention.

The conventional ear corn crusher-feeder is not well adapted for handling machine-picked ear corn, which is ordinarily not completely husked, because the tough fibrous husks tend to become entangled on the roll teeth and render it inoperative by wrapping around the moving roll. It is common practice to obviate this difficulty by providing negative rake on the working face and peripheral cutting edge of the teeth, this negative rake enabling the tooth to free itself of the entangled husks by the wiping action of materials through which it is traveling. However, negative rake destroys the biting action of the peripheral cutting edges of the teeth on ear corn, especially so when the corn is encased in tough fibrous husks. It is, therefore, an object of this invention to provide a method and a means for automatically disentangling the fibrous husks from teeth having the reverse characteristics, that is, positive rake, so that the roll will not become clogged with husks nor its cutting efficiency impaired.

Another object is to provide a toothed rotative element that will limit the maximum size of the reduced cob, so that the product will readily flow through suitable flow-controlling means.

With the above and other objects in view, the present invention consists in the combination and arrangement of parts, hereinafter more fully described, illustrated in the accompanying drawing, and more particularly pointed out in the appended claims, it being understood that changes may be made in the form, size, proportions and minor details of construction, without departing from the spirit, or sacrificing any of the advantages of the invention.

In the drawing:

Fig. 1 is a fragmentary top plan view of an ear corn crushing machine showing our toothed rotative element in position therein;

Fig. 2 is a fragmentary sectional end elevational view thereof;

Fig. 3 is an isometric view of a formed disk in which a cutting tooth is rigidly mounted;

Fig. 4 is an isometric view of one of the cutting teeth;

Fig. 5 is a transverse section through the cutting roll showing the position a tuft of fibrous material may assume when entangled upon a tooth; and Fig. 6 is a transverse sectional view similar to Fig. 5, showing the position an ear corn cob may assume when it is severed longitudinally.

Referring to the drawing in which we have shown one embodiment of our invention, the numeral 9 indicates a housing that is provided with an outlet opening 10 in the usual manner. In the housing is journaled a shaft 11 upon which is mounted a plurality of thin disks 12 that have a hole 13 that is adapted to receive the shaft. These disks are preferably, but not necessarily, formed of rolled metal. An angularly disposed slot 14 is provided in each disk to receive the tooth 15 which is likewise formed of rolled metal with a working face of considerable width. This working face is inclined forward so that the peripheral cutting edge 16 has positive rake when the direction of rotation is as indicated by the arrows shown in Fig. 2. The outer end 17 of the tooth is beveled to provide the necessary clearance for the peripheral cutting edge. To this cutting edge, an overlay of wear-resistant metal (not shown) may be applied. This however, forms no part of the present invention as it constitutes the subject matter in a separate application to be filed by us.

After the tooth is assembled with the disk, the adjacent edges are welded together to provide a rigid cutter unit that may be mounted on the shaft and secured thereto by welding or other means. To obtain certain definite operating characteristics, with respect to the handling and reducing of the husks on ear corn, it becomes necessary to space these cutter units circumferentially in two or more series, and axially so that there is an overlapping of the paths of travel circumscribed by the peripheral cutting edges of adjacent teeth in the two or more series. This overlapping of the cutting edges is of prime importance as it provides a means whereby the corn husks may be disentangled from teeth having positive rake, as hereinafter described.

The peripheral cutting edges of the teeth coact with a stationary shear bar 18 that is mounted in the housing in close relation to the moving teeth. This bar is usually made of tool steel or else the shearing edge S is hard-surfaced with a wear-resistant metal (not shown).

In operation, when ear corn is being reduced, such corn being encased in tough fibrous husks, we find that the longer tufts of husks H will loop around the projecting tooth as clearly illustrated in Fig. 5, the bighted end of the loop being supported by the disk 12 that carries the tooth 15. As the tooth travels around through the material that is undergoing reduction, the trailing legs, or the free ends of the loop, become tensioned and assume the position as clearly indicated in the said figure. Under this tension the stability of the loop, with respect to the tooth upon which it is entangled, becomes pronounced, especially so if the trailing legs are long enough to wrap more than one hundred and eighty degrees (180°) around the roll.

To impair the stability of the loop so that it may be thrown off the tooth by centrifugal action, or by wiping action, it becomes necessary to cut off one or both of the trailing legs relatively short. To accomplish this, the adjacent teeth in the several series are positioned axially so that the peripheral cutting edges travel in overlapping paths as above mentioned. This arrangement permits each of the trailing legs to be drawn over the cutting edge of an adjacent follower tooth in the next series; consequently, the end sections of the legs are severed as the follower teeth pass in close relation to the shear bar. If only one leg is cut, the loop is reduced to an unbalanced status with respect to the tooth on which it is impaled, and consequently, it is readily wiped off. However, if both legs are severed to the same length, the state of balance remains unchanged, but the tendency for the relatively short trailing legs to wrap around the roll becomes impaired to the extent that the bighted end of the loop may be thrown off the tooth by centrifugal action.

In operation, it will be further noted that the disk 12 serves another purpose aside from carrying the cutting teeth; that is, the several disks form a rotating barrier that co-operates with the stationary shear bar in preventing oversized pieces of cob from traveling past the bar without being reduced. By limiting the clearance between this barrier and the shear bar, it becomes practical to build the toothed roll, by modifying the radius of the disks, so that it will produce a reduced cob, the size of which will not exceed a predetermined limit. A convenient way of modifying the disks to obtain more tooth projection, and likewise a reduced final product that is larger in size, is to machine a flat 19 in front of the tooth and a similar flat 20 on the opposite side thereof.

Owing to the fact that an ear of corn tends to align itself parallel with the roll as it descends downwardly into the shearing zone, it will be apparent that the aligned cob, bare or otherwise, will be sheared longitudinally, as shown in Fig. 6, providing the clearance between the rotating barrier and the shear bar is sufficiently restricted to prevent passage of the whole cob. As a result, it becomes practical to produce a cob product that contains a major portion that is reduced to size by being sheared lengthwise into segments that are relatively long as compared with cross-sectional dimensions.

This is in contrast to the reduced cob produced by some other types of cob crushing rolls, such product ordinarily containing a major portion that is reduced to short cylinders of varying lengths. The advantage of a reduced cob that is characterized by being split lengthwise, is the fact that the product flows more readily through the narrow outlet port opening 10, and is subject to more accurate flow control than the cylindrical product.

In comparing the herein disclosed disk type roll construction with a roll having a cylindrical body, the tooth projection and the distribution of the teeth being the same, it will be observed that the disk type has an important advantage when dealing with a tuft of husks looped around a tooth. In this respect, the disk type roll will sever the trailing legs of the loop shorter than the roll having a cylindrical body. This is because the spaced apart disks permit the tensioned legs of the loop to assume an arcuate length that is much shorter than if they were drawn over the cylindrical roll body. For this reason, if the cylindrical body type roll construction is employed, it becomes necessary to space the teeth closer together circumferentially, in order to sever the legs of the loop short enough to disentangle the bighted end of the loop from the roll tooth as above explained. This is not desirable because it entails additional expense in the manufacture of such rolls.

From the foregoing description it will be obvious that we have perfected a simple, practical, and efficient machine that is adapted for reducing ear corn and other materials.

What we claim is:

1. In a cob crusher, a housing having a reduced cob outlet; a shaft journaled in said housing; a plurality of cutter units mounted on the shaft in spaced axial relation, each cutter unit including a tooth having a peripheral cutting edge; a stationary member co-acting with the peripheral cutting edges of the several teeth to affect a shearing action on the cob; and a disk joined to the tooth on both faces thereof for supporting each tooth and co-operating with said bar for limiting the size of the reduced cob that passes said stationary bar.

2. A toothed rotative assembly for reducing machines comprising a shaft; a plurality of disks mounted on said shaft; and a relatively wide non-detachable tooth joined internally to each disk for rotation therewith, said tooth being joined to said disk on both faces thereof.

3. In an ear corn reducing machine adapted to reduce the cob so that a major portion is severed longitudinally; a housing provided with an outlet; a horizontally disposed shaft journaled in said housing, a plurality of cutter units mounted on the shaft in spaced axial relation, each unit comprising a disk with a tooth joined integrally therewith on the working face and formed with a peripheral cutting edge; a stationary shear bar in said machine and co-acting with said teeth to reduce the ear corn, and rotative means for supporting the cobs so that they may be severed longitudinally when the ear corn enters the cutting zone in a horizontal position, the said means comprising the spaced-apart disks.

FRANK H. NICKLE.
ARTHUR G. NICKLE.